United States Patent
Kamasuka

(10) Patent No.: US 10,860,172 B2
(45) Date of Patent: Dec. 8, 2020

(54) IMAGE FORMING APPARATUS AND CONTROL METHOD THEREOF

(71) Applicant: CANON KABUSHIKI KAISHA, Tokyo (JP)

(72) Inventor: Atsushi Kamasuka, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/234,400

(22) Filed: Dec. 27, 2018

(65) Prior Publication Data
US 2019/0212899 A1    Jul. 11, 2019

(30) Foreign Application Priority Data

Jan. 9, 2018 (JP) ................................. 2018-001456

(51) Int. Cl.
*G06F 3/0481* (2013.01)
*H04N 1/00* (2006.01)
*G06F 3/12* (2006.01)

(52) U.S. Cl.
CPC ........ *G06F 3/04817* (2013.01); *G06F 3/1204* (2013.01); *G06F 3/1253* (2013.01); *G06F 3/1286* (2013.01); *H04N 1/00411* (2013.01); *H04N 1/00413* (2013.01); *H04N 1/00506* (2013.01)

(58) Field of Classification Search
None
See application file for complete search history.

(56) References Cited

U.S. PATENT DOCUMENTS

| | | | | |
|---|---|---|---|---|
| 5,673,405 A | * | 9/1997 | Tange | G06F 3/04817 715/745 |
| 5,986,657 A | * | 11/1999 | Berteig | G06F 3/0481 715/792 |
| 6,469,722 B1 | * | 10/2002 | Kinoe | G06F 3/0481 715/808 |
| 7,606,741 B2 | * | 10/2009 | King | G06F 16/41 705/27.2 |
| 10,019,241 B2 | * | 7/2018 | Salvi | G06F 8/30 |
| 2002/0033844 A1 | * | 3/2002 | Levy | G06F 3/0484 715/744 |
| 2005/0108332 A1 | * | 5/2005 | Vaschillo | H04L 51/22 709/206 |
| 2007/0177227 A1 | * | 8/2007 | Kamasuka | H04N 1/00278 358/474 |
| 2007/0236725 A1 | * | 10/2007 | Harmon | G06F 3/1205 358/1.15 |
| 2007/0240124 A1 | * | 10/2007 | Taneda | H04N 1/00962 717/129 |
| 2008/0049971 A1 | * | 2/2008 | Ramos | G06F 16/44 382/100 |
| 2009/0315867 A1 | * | 12/2009 | Sakamoto | G06F 3/03547 345/184 |

(Continued)

FOREIGN PATENT DOCUMENTS

JP    2016-71680 A    5/2016

*Primary Examiner* — Anh-Vinh T Nguyen
(74) *Attorney, Agent, or Firm* — Canon U.S.A., Inc. IP Division

(57) ABSTRACT

The setting of grouping icons is made to a framework or each application, and the icons are grouped for each application based on the setting and displayed. Alternatively, in a case where an application type is a specific type, the icons are automatically grouped for each application and displayed.

15 Claims, 14 Drawing Sheets

(56) References Cited

U.S. PATENT DOCUMENTS

| | | | |
|---|---|---|---|
| 2010/0125715 A1* | 5/2010 | Takamatsu | G06F 3/0632 |
| | | | 711/170 |
| 2012/0166992 A1* | 6/2012 | Huynh | H04L 67/10 |
| | | | 715/771 |
| 2012/0254842 A1* | 10/2012 | Henderson | G06F 8/76 |
| | | | 717/136 |
| 2012/0304189 A1* | 11/2012 | Tominaga | G06F 3/067 |
| | | | 718/104 |
| 2013/0100474 A1* | 4/2013 | Ono | H04N 1/00474 |
| | | | 358/1.13 |
| 2013/0246973 A1* | 9/2013 | Tomiyasu | G06F 3/0485 |
| | | | 715/830 |
| 2014/0282217 A1* | 9/2014 | Musa | G06F 3/0481 |
| | | | 715/781 |
| 2016/0021179 A1* | 1/2016 | James | G06Q 10/10 |
| | | | 709/204 |
| 2016/0277407 A1* | 9/2016 | Nakashima | G06F 21/00 |
| 2017/0142267 A1* | 5/2017 | Ii | H04N 1/00389 |
| 2017/0329468 A1* | 11/2017 | Schon | G06F 3/04845 |
| 2018/0091682 A1* | 3/2018 | Kamasuka | H04N 1/00244 |
| 2018/0131824 A1* | 5/2018 | Kamasuka | H04N 1/00411 |
| 2019/0187878 A1* | 6/2019 | Kamasuka | G06F 3/04817 |

\* cited by examiner

FIG.5
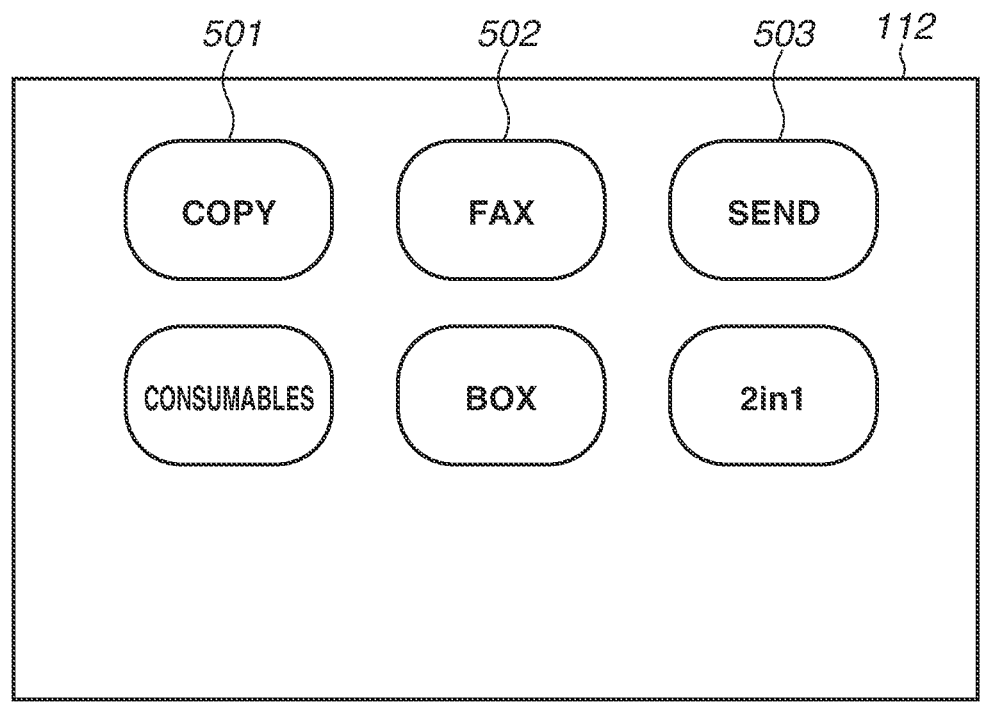
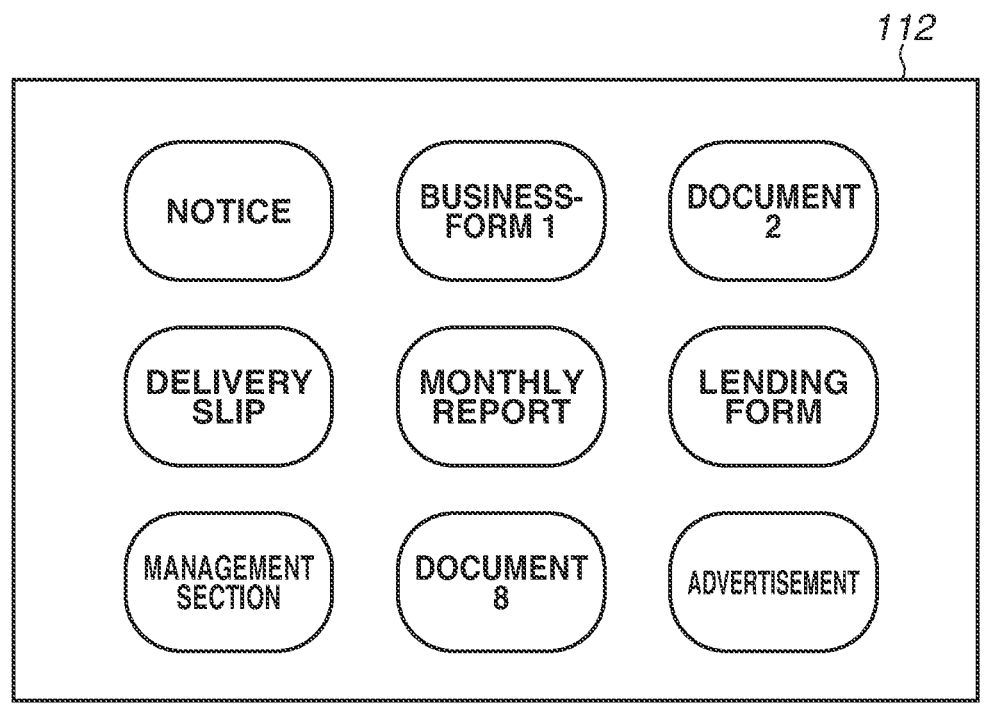

FIG.6

BASIC SETTING

ICON NAME: [BUSINESS-FORM 1] ~601

FORM DATA: [　　　　　] ~602

PRINT SETTING ~608

SHEET SIZE: [A4 ▼]

TWO-SIDED: [ONE-SIDED ▼]

BINDING DIRECTION: [LONG-SIDE BINDING ▼]

COLOR MODE: [AUTOMATIC ▼]

NUMBER OF COPIES: [1 ▼]

---

COMMON SETTING

603 — ICON DISPLAY GROUPING:  ● ON    ○ OFF

604 — GROUP NAME: [SUPER BUSINESS-FORM]

605 — NUMBER OF REGISTRATIONS: GROUP ICONS IF [3] OR MORE BUTTON SETTINGS ARE REGISTERED

606 — ICON NAME: GROUP ICONS CONTAINING [hoge]

607 — NAME OF ICON TO BE EXCLUDED: GROUP ICONS EXCLUDING ICONS CONTAINING [BUSINESS-FORM]

609 — [REGISTER] [CANCEL]

FIG.7

| ICON NAME | BUTTON ID | FORM DATA | PRINT SETTING | ICON IMAGE FILE | DISPLAY POSITION | ICON DISPLAY SETTING |
|---|---|---|---|---|---|---|
| BUSINESS-FORM 1 | 0 | form1.dat | pSettings1.dat | aIcon1.dat | BEGINNING | iSettings1.dat |
| DELIVERY SLIP | 1 | form2.dat | pSettings2.dat | aIcon1.dat | END | iSettings1.dat |
| LENDING FORM | 2 | form3.dat | pSettings3.dat | aIcon1.dat | END | iSettings1.dat |
| MANAGEMENT SECTION | 3 | form4.dat | pSettings4.dat | aIcon3.dat | BEGINNING | iSettings1.dat |

| APPLICATION ID *1001* | BUTTON ID *1002* | ICON TITLE *1003* | DISPLAY POSITION *1004* | ICON IMAGE INFORMATION *1005* |
|---|---|---|---|---|
| 1 | 1 | BUSINESS-FORM 1 | BEGINNING | aIcon1.dat PIXEL DATA |
| 1 | 10 | SUPER BUSINESS-FORM | BEGINNING | aIcon0.dat PIXEL DATA |
| 2 | 11 | EASY TRANSMISSION | BEGINNING | bIcon0.dat PIXEL DATA |

FIG.12

| APPLICATION ID | APPLICATION NAME | APPLICATION TYPE | GROUPING SETTING |
|---|---|---|---|
| 1 | SUPER BUSINESS-FORM | 1 | gSettings1.dat |
| 2 | EASY TRANSMISSION | 1 | gSettings2.dat |

GROUPING SETTING　　☑ SET APPLICATION NAME AS GROUP NAME　*1401*

APPLICATION NAME　GROUPING ON/OFF *~1402*　GROUP NAME *~1403*

SUPER BUSINESS-FORM:　⦿ ON ○ OFF　[ SUPER BUSINESS-FORM ]

EASY TRANSMISSION:　⦿ ON ○ OFF　[ EASY TRANSMISSION ]

ID CARD COPY:　⦿ ON ○ OFF　[ ID CARD COPY ]

URL PRINT:　⦿ ON ○ OFF　[ URL PRINT ]

[ REGISTER ]　[ CANCEL ]

IMAGE FORMING APPARATUS AND CONTROL METHOD THEREOF

BACKGROUND

Field

The present disclosure relates to an image forming apparatus into which an extended application is installable, a method of controlling the image forming apparatus, etc.

Description of the Related Art

There are systems in which a loadable program (application) is installed as firmware controlling a device so that a service is enabled to be used. There are also systems in which an application is installed in various information devices such as office multi-function peripherals (MFPs) to provide additional functions or additional services.

There is known a user interface for selecting a shortcut that enables a user to select and execute a specific shortcut with ease. Japanese Patent Application Laid-Open No. 2016-71680 discusses that shortcut keys 61a and 61c for registered shortcuts are assigned to a specific tab 71 and displayed on a shortcut list screen 50. The registered shortcuts are grouped based on an attribute of the shortcuts. The tabs 71 to 73 are generated for each group (i.e., for each attribute) and displayed on a shortcut screen (refer to FIG. 4 and elsewhere).

In an application configured to execute one-click printing of a pre-designated image file according to a print setting, it is conceivable, for example, to register and use a plurality of icons based on the designated image file or the print setting. An increase in the number of such application icons makes an operation unit complicated, and this makes it difficult to find a desired icon.

A technique for hiding an icon that is not executable is not useful in the cases where there are many executable icons. There is a technique in which icons are aggregated into a folder by superimposing the icons, but it takes time to manually aggregate, one by one, icons located across a plurality of screens into a folder. In cases where a single device is used by a large number of unspecified users, it is difficult to appropriately aggregate icons into a folder.

SUMMARY

The present disclosure is directed to a method for flexibly performing display control of a display item relating to a function of an image forming apparatus.

According to an aspect of the present disclosure, an image forming apparatus includes a display unit configured to display a plurality of display items configured to issue an instruction to execute a function in the image forming apparatus, a setting unit configured to make a setting of whether to group-display the plurality of display items for each predetermined function of the image forming apparatus, and a display control unit configured to display, based on the setting, at least one display item corresponding to the predetermined function of the image forming apparatus and formed by grouping the plurality of display items.

Further features will become apparent from the following description of exemplary embodiments with reference to the attached drawings.

BRIEF DESCRIPTION OF THE DRAWINGS

FIG. 5 illustrates an example of an operation screen of the image forming apparatus in the exemplary embodiment.

FIG. 6 illustrates an example of an application setting screen in the exemplary embodiment.

FIG. 7 illustrates an example of an application setting information table in the exemplary embodiment.

FIG. 10 illustrates an icon registration table based on which the icon information is generated in the exemplary embodiment.

FIG. 12 illustrates an example of an application registration table in the exemplary embodiment.

FIG. 14 illustrates an example of a framework grouping setting screen in the exemplary embodiment.

DESCRIPTION OF THE EMBODIMENTS

Various exemplary embodiments of the present disclosure will be described below with reference to the drawings. While an image forming apparatus (multi-function peripheral (MFP)) will be described as an example of an information processing apparatus of the present disclosure, the information processing apparatus can be a mobile terminal, tablet, or any other device having a similar configuration.

Figure 1:
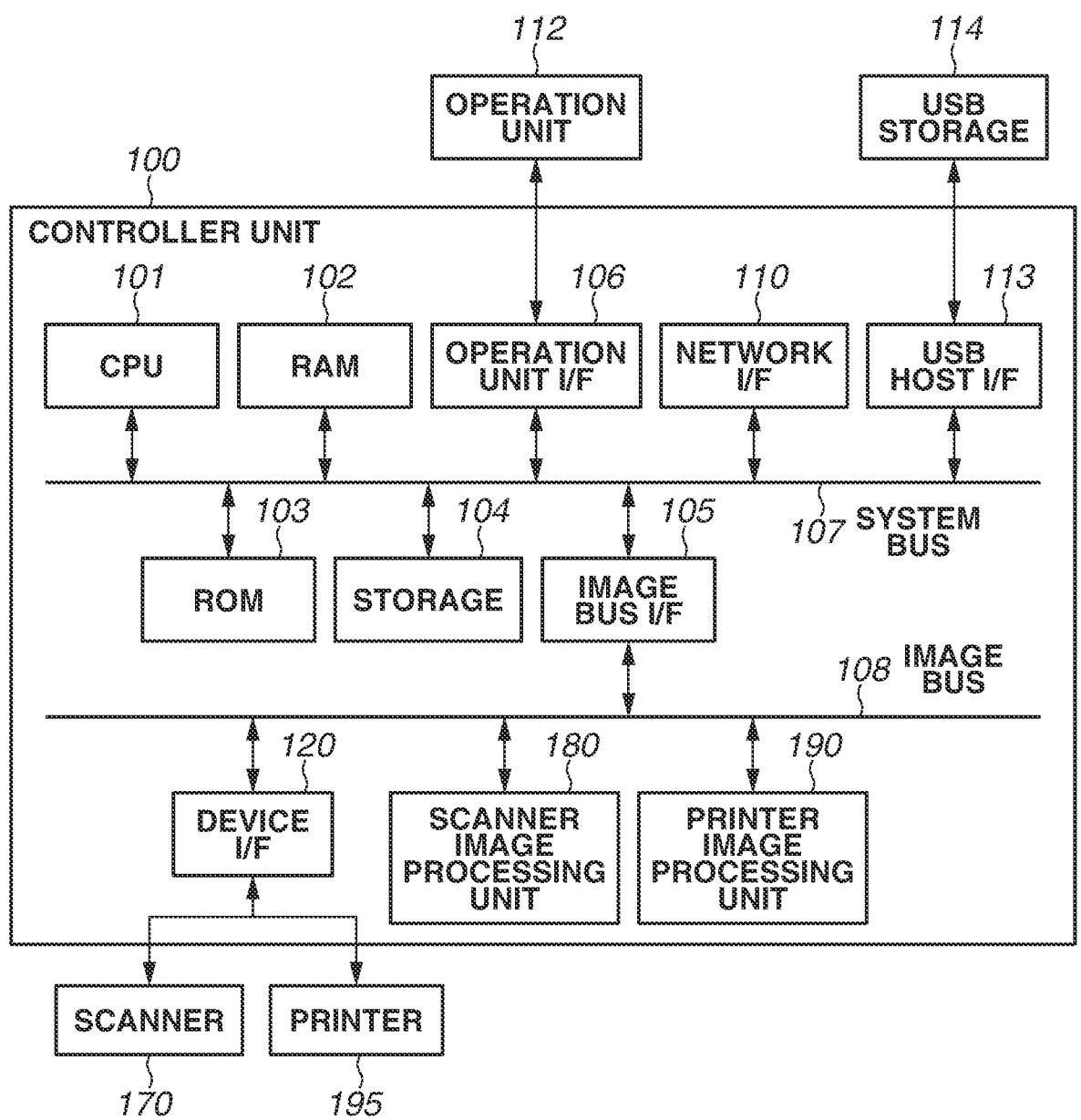
FIG. 1 illustrates a hardware configuration of an image forming apparatus in an exemplary embodiment.

FIG. 1 is a block diagram illustrating an example of the configuration of a main portion of the image forming apparatus. The image forming apparatus includes a controller unit 100 connected to a scanner 170, which is an image input device, and a printer 195, which is an image output device, and to an operation unit 112. The controller unit 100 performs control to realize a copy function in which image data read by the scanner 170 is printed and output by the printer 195.

The controller unit 100 includes a central processing unit (CPU) 101, which executes a boot application stored in a read-only memory (ROM) 103 to activate an operation system (OS). The CPU 101 executes an application stored in a storage 104 to thereby execute various processing. A random access memory (RAM) 102 is used as a work area of the CPU 101. The RAM 102 provides the work area as well as an image memory area for temporarily storing image data. The storage 104 stores the applications and image data.

The CPU 101 is connected to the ROM 103, the RAM 102, an operation unit interface (operation unit I/F) 106, etc. via a system bus 107. The CPU 101 is also connected to a network interface (network I/F) 110, a universal serial bus (USB) host I/F 113, and an image bus interface (image bus I/F) 105. The operation unit I/F 106 is an interface for the operation unit 112 including a touch panel and outputs, to the operation unit 112, image data to be displayed at the operation unit 112. The operation unit I/F 106 outputs, to the CPU 101, information input at the operation unit 112 by a user. The network I/F 110 is an interface for connecting the image forming apparatus to a local area network (LAN).

The USB host I/F 113 is an interface unit configured to communicate with a USB storage 114. The USB host I/F 113 is an output unit configured to store, in the USB storage 114, data stored in the storage 104. The USB host I/F 113 inputs data stored in the USB storage 114 and transmits the data to the CPU 101. The USB storage 114 is an external storage apparatus configured to store data and is attachable to and detachable from the USB host I/F 113. A plurality of USB devices including the USB storage 114 is connectable to the USB host I/F 113.

The image bus I/F 105 is a bus bridge configured to connect the system bus 107 and an image bus 108, which transfers image data at high speed, and convert the data format. The image bus 108 includes a peripheral component interconnect (PCI) bus or an Institute of Electrical and Electronics Engineers (IEEE) 1394 bus. A device IX 120, a scanner image processing unit 180, and a printer image processing unit 190 are provided on the image bus 108.

The scanner 170 and the printer 195 are connected to the device I/F 120, and the device I/F 120 performs synchronous/asynchronous conversion on image data. The scanner image processing unit 180 performs correction, processing, and editing on input image data. The printer image processing unit 190 performs correction, resolution conversion, etc. on printed output image data according to the printer 195.

Figure 2:
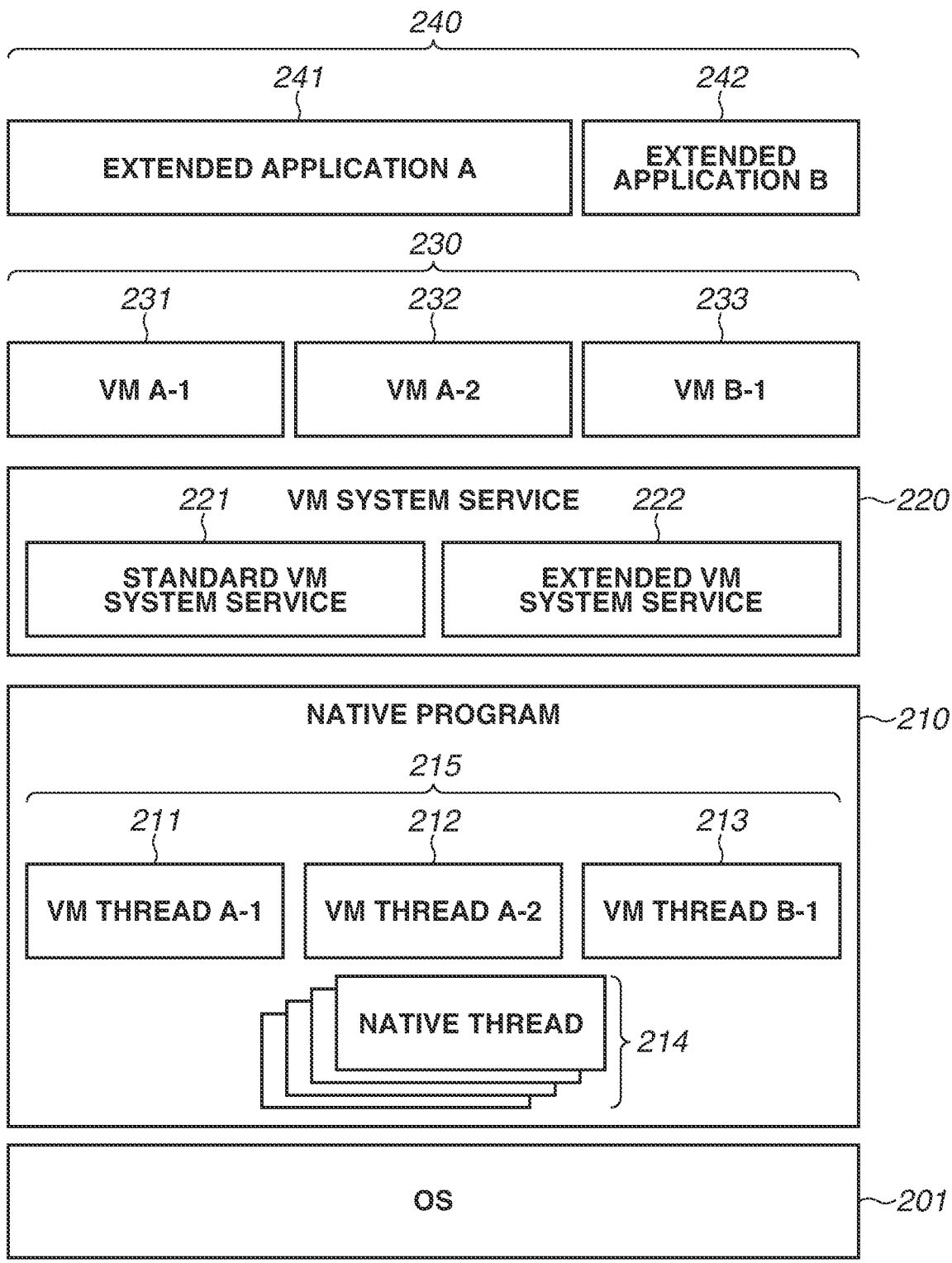
FIG. 2 illustrates a software configuration of the image forming apparatus in the exemplary embodiment.

FIG. 2 is a block diagram illustrating an example of an execution environment of an extended application of the image forming apparatus. The CPU 101 loads an application stored in the storage 104 into the RAM 102 and executes the loaded application to realize each module in FIG. 2. A native program 210 for controlling image processing units such as a printer, facsimile, and scanner runs on an OS 201, which is an operating system. A virtual machine (VM) 230 is the execution environment of the extended application. The VM 230 is a module configured to execute an application that controls the extended application. The extended application always runs on the VM 230. While the VM 230 is a software module that runs on the CPU 101 in the present exemplary embodiment, the VM 230 can be a hardware module.

Native threads 214 for controlling the image processing units such as the printer, facsimile, and scanner and a VM thread 215 for operating the VM 230 are present in the native program 210. The number of VM threads in the VM thread 215 corresponds to the number of VMs in the VM 230. In the present exemplary embodiment, three VIM threads 211, 212, and 213 are generated.

A VM system service 220 is a utility library shared and used by an extended application 240. The extended application 240 calls a function of the VM system service 220, which saves the time and effort to develop an extended application, or enables access to the modules of the image forming apparatus. The VM system service 220 includes a standard VM system service 221 for causing a VM to perform at least a minimal operation as a VM and an extended VM system service 222 for providing access to the modules of the image forming apparatus and the functions of the OS 201.

The VM 230 executes the extended application 240. The VM 230 is generated for each thread of the extended applications. In FIG. 2, a VM A-1 231 and a VM A-2 232 for operating two threads in an extended application A 241 and a VM B-1 233 for operating one thread in an extended application B 242 are generated.

An icon is displayed for each extended application on a main menu screen displayed at the operation unit 112 of the image forming apparatus. If the operation unit I/F 106 detects, via the operation unit 112, that the icon is selected by the user, the operation unit I/F 106 transmits to the CPU 101 a notification that the icon is selected. The CPU 101 upon receipt of the notification activates the extended application selected by the user.

Figure 3:
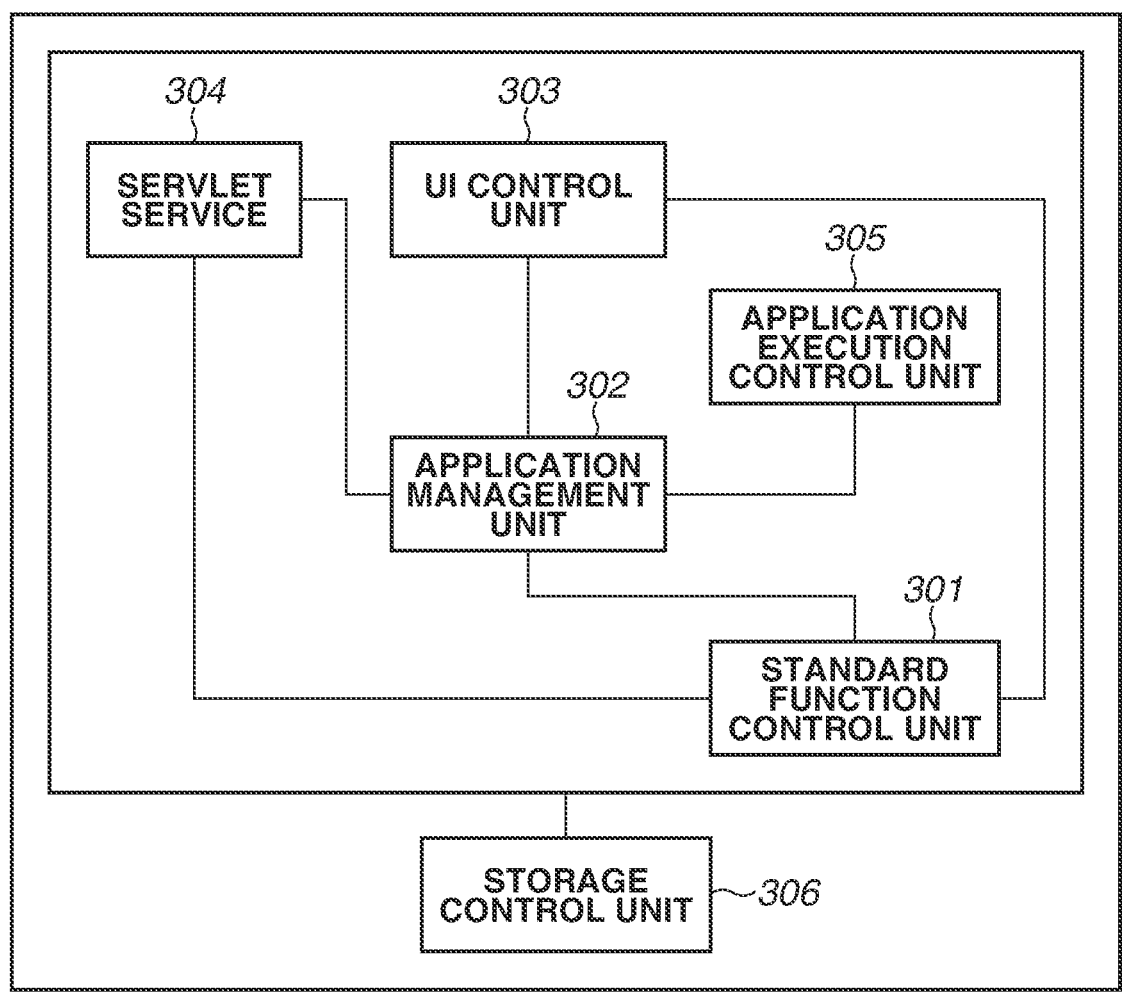
FIG. 3 illustrates a software configuration of the image forming apparatus in the exemplary embodiment.

FIG. 3 illustrates the configuration of software modules that run on the CPU 101 of the image forming apparatus in the present exemplary embodiment. A standard function control unit 301 is a module that performs control of the standard functions of the image forming apparatus, such as copy and facsimile functions, and performs other control necessary for the image forming apparatus (e.g., control of the USB host bus I/F 113), and controls various kinds of processing using the corresponding native threads 214.

An application management unit 302 is a module that manages installation, activation, etc. of the extended application 240.

The box portion surrounding the units 301 to 305 in FIG. 3 is implementable using part or both of the standard VM system service 221 and the extended VM system service 222 in FIG. 2. A storage control unit 306 is implementable using part of the native program 210 or using the OS 201. There are cases where both modules are used. The storage control unit 306 can be implemented as part of the VM system service 220.

A UI control unit 303 is a module that displays a screen at the operation unit 112, receives a user operation, and transmits a notification of information about the operation to an appropriate module (the standard function control unit 301 or the application management unit 302). For example, if the user activates the application 240 from the operation unit 112, the UI control unit 303 transmits a notification to the application management unit 302, and the VM thread 215 is generated and the application 240 runs on the VM 230. In the case where Hypertext Transfer Protocol (HTTP) access is performed via the network I/F 110, the servlet service 304 performs the following operation. Specifically, the servlet service 304 receives the request and distributes processing to a module (the standard function control unit 301 or the application management unit 302) based on the accessed universal resource locator (URL). An application execution control unit 305 is a module that performs is execution control on an application activated by the application management unit 302. Specifically, the application execution control unit 305 controls the VM thread 215, the VM system service 220, the VM 230, and the extended the application 240. The storage control unit 306 is a module that records and manages setting information about the image forming apparatus, and each module accesses the storage control unit 306 to refer to and set a setting value. In the present exemplary embodiment, setting information for aggregating and displaying an icon is also recorded in the storage control unit 306.

Figure 4:
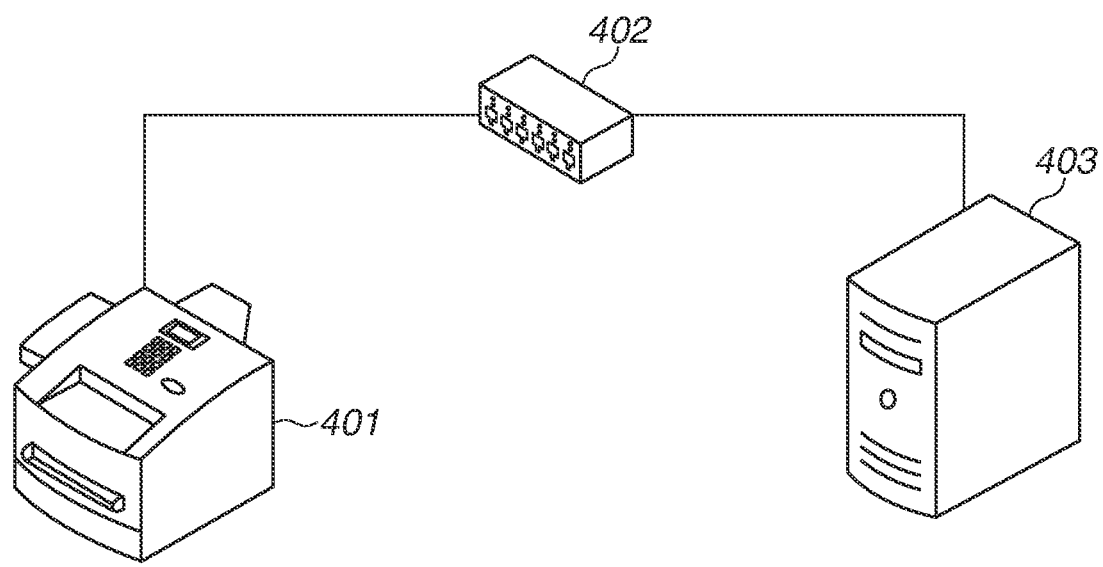
FIG. 4 illustrates a system configuration including the image forming apparatus in the exemplary embodiment.

FIG. 4 illustrates an example of the configuration of a printing system including the image forming apparatus according to the present exemplary embodiment. The printing system includes an image forming apparatus 401, a network router 402, and an external apparatus 403. The external apparatus 403 installs an extended application via an installer into the image forming apparatus 401 connected via a network, and connects to the image forming apparatus 401 using a browser to change the settings of the extended application. In an exemplary embodiment of the present disclosure, the settings that relate to the aggregation of the icon display of the extended application, etc. are made. The network router 402 mediates the communication between the image forming apparatus 401 and the external apparatus 403. The image forming apparatus 401 executes processing to install an extended application in response to an installation request from the external apparatus 403 and transmits an HTTP response to an HTTP request.

FIG. 12 illustrates an extended application management table registered in the storage control unit 306. In the management table, information such as an identifier (ID) 1201, name 1202, and type 1203 of each application is registered in association in the application installation processing. In general, the ID 1201 can uniquely be assigned to each application at the time of development. In the present exemplary embodiment, two applications of application IDs 1 and 2 are previously installed. The two applications correspond to the extended applications A 241 and A 242 in FIG. 2. In a grouping setting 1204, a grouping setting is recorded.

FIG. 5 illustrates an example of the display of icons at the operation unit 112. The image forming apparatus has functions such as copy, fax, and send (scanned image transmission) functions. The icons for calling the functions are displayed at the operation unit 112. An icon for executing a function provided by an installed extended application is also displayed at the operation unit 112 in addition to the above-described functions. For example, in an application that executes one-click printing of a pre-designated image file based on a print setting, a plurality of icons is generally set based on the pre-designated image file or the print setting. Thus, there often arises a case where a plurality of icons of one application is presented as illustrated in FIG. 5. When there is a plurality of such applications, the operation unit 112 can become significantly complicated. The upper part of FIG. 5 discloses a copy function, fax function, and sheet scan and electronic data transmission function (also referred to as "send function"). At the press of any of the buttons, the native program 210 and the OS 201 in FIG. 2 are called, and the functions of the image forming apparatus in FIG. 1 are controlled. For example, in the case where a sheet is placed on the MFP and a "SEND" button is pressed, the scanner 170 is driven and scans the sheet. Then, the scan data is processed by the scanner image processing unit 180 and transmitted to a network (not illustrated) via the network I/F 110. A "CONSUMABLES" button is a button for calling the function of checking the remaining amount of toner or ink in the image forming apparatus and ordering the toner or ink. A "BOX" button is a button for calling the function of providing an instruction to print or transmit via the network a document or scan data stored in the storage 104. The lower part of FIG. 5 illustrates an application configured to be one-touch activated according to various use cases. For example, if a "BUSINESS-FORM 1" button is pressed, a predetermined business-form is called. Then, the business-form is printed according to a setting value input via a predetermined interactive user interface (UI). Then, the application automatically ends. The foregoing is a description of the application configured to be one-touch activated. The lower part of FIG. 5 also illustrates another example of a one-touch application. This is compatible with another function such as a signage (advertisement display board) function. The buttons correspond to the extended application 240. While FIG. 2 illustrates an example in which the extended application 240 includes two extended applications, there are cases where the number of extended applications of the extended application 240 is two or more.

FIG. 6 illustrates an example of a button setting screen for the extended applications installed in the image forming apparatus of the present disclosure. As described above, in the present exemplary embodiment, the two extended applications (super business-form, easy transmission) in FIG. 12 are previously installed. The settings of each application can be made by, for example, connecting to a web service of the image forming apparatus 401 from a web browser that runs on the external apparatus 403 and then making the settings via the web browser. The setting, however, is not limited to the example. The easy transmission application has functions such as the function of transmitting data obtained by scanning a sheet and converting the scan data into electronic data and the function of fax transmission.

The super business-form application is a form printing application that performs one-click printing of form data registered in the image forming apparatus by the user. In the form printing, a layout of one or more fields is defined as form data. Then, numbers and text data are input based on the layout defined by the form data. Text data that differs for each output unit is superimposed on the form data in which a shape such as a company logo and fixed data is formed, and the text data and the form data are combined. In this way, the printing of a business-form such as a slip or a bill is realized. First, in the basic setting, an "icon name" setting 601 and a "form image data registration" setting 602 can be made. Then, in a print setting 608, general print settings such as the sheet size and two-sided printing can be made. The above-described settings are mere examples, and the settings are not limited to the examples. In the present disclosure, an "icon display grouping" setting 603 can be made as a common setting for each application. In the case where the "icon display grouping" setting 603 is made to "OFF", icons corresponding to the number of button settings registered in the storage control unit 306 are each generated and displayed. In the case where the "icon display grouping" setting 603 is made to "ON", button settings are registered in the storage control unit 306 based on the subsequent settings from a "group name" setting 604 to a "name of icon to be excluded" setting 607, and the icons are aggregated and displayed based on the button settings. More specifically, in the case where the "number of registrations" setting 605 is designated, the icons are aggregated and displayed if the number of existing button settings is not less than the designated number. Specifically, in the case where "3" is designated, the icons are aggregated if the number of registered button settings is three or more. Then, one icon associated with the group 604 is displayed. In the case where a character string is designated with respect to the "icon name" setting 606, icons related to button settings having an icon name that partially matches the character string are aggregated and displayed. The processing is not executed in the case where no designation is made. In the case where the "name of icon to be excluded" setting 607 is designated, icons related to button settings having an icon name that partially matches the character string are excluded from a grouping target, and control is performed to aggregate and display the icons other than the excluded icons. The processing is not executed if no designation is made. A value designated with respect to the "group name" setting 604 is assigned to the icon name of the single aggregated icon. Based on the above-described settings, all or some of the icons are aggregated and displayed as a single icon, and this prevents the operation unit 112 from being crowded with the icons.

After the series of settings is completed, if a registration button 609 is pressed, the button settings with which printing is executable under the set conditions described above are registered in the storage control unit 306.

FIG. 7 illustrates an example of button setting information about the printing application that is registered in the storage control unit 306 as a result of the setting in FIG. 6. An icon name 701 is the icon name set in the setting 601. A button ID 702 is an ID for identifying an icon and is used to identify a pressed button. Form data 703 is target image data in the case of executing the application to execute printing, and is data registered by the user in the setting 602. A print setting 704 is information that collectively specifies the color mode, the number of copies, etc. in the case of printing the form and is set by the user in the setting 607. An icon image file 705 is a file that holds icon images. There are two icon image files 705, one for normal icons (Icon1.dat) and the other for group icons (Icon0.dat). While the normal icons are normally registered, the user can register other icons (not illustrated).

A display position 706 is a setting to designate the display position of an icon at the operation unit 112, and either the beginning or the end is designated. Alternatively, any position can be settable. An icon display setting 707 is a setting to set a grouping condition in the case of displaying icons at the operation unit 112 and is a common setting value for the applications set by the user in the settings 603 to 607. The same setting value is registered as the setting value regardless of the other button settings. While an entry of application type information is not illustrated in FIG. 7, it is desirable to provide such an entry. Specifically, information for identifying an application to which each icon relates can be added to the rightmost section in FIG. 7. In this way, while only the icons that relate to the business-form application are registered in FIG. 7, an icon that relates to the transmission application can also be registered.

Figure 8:
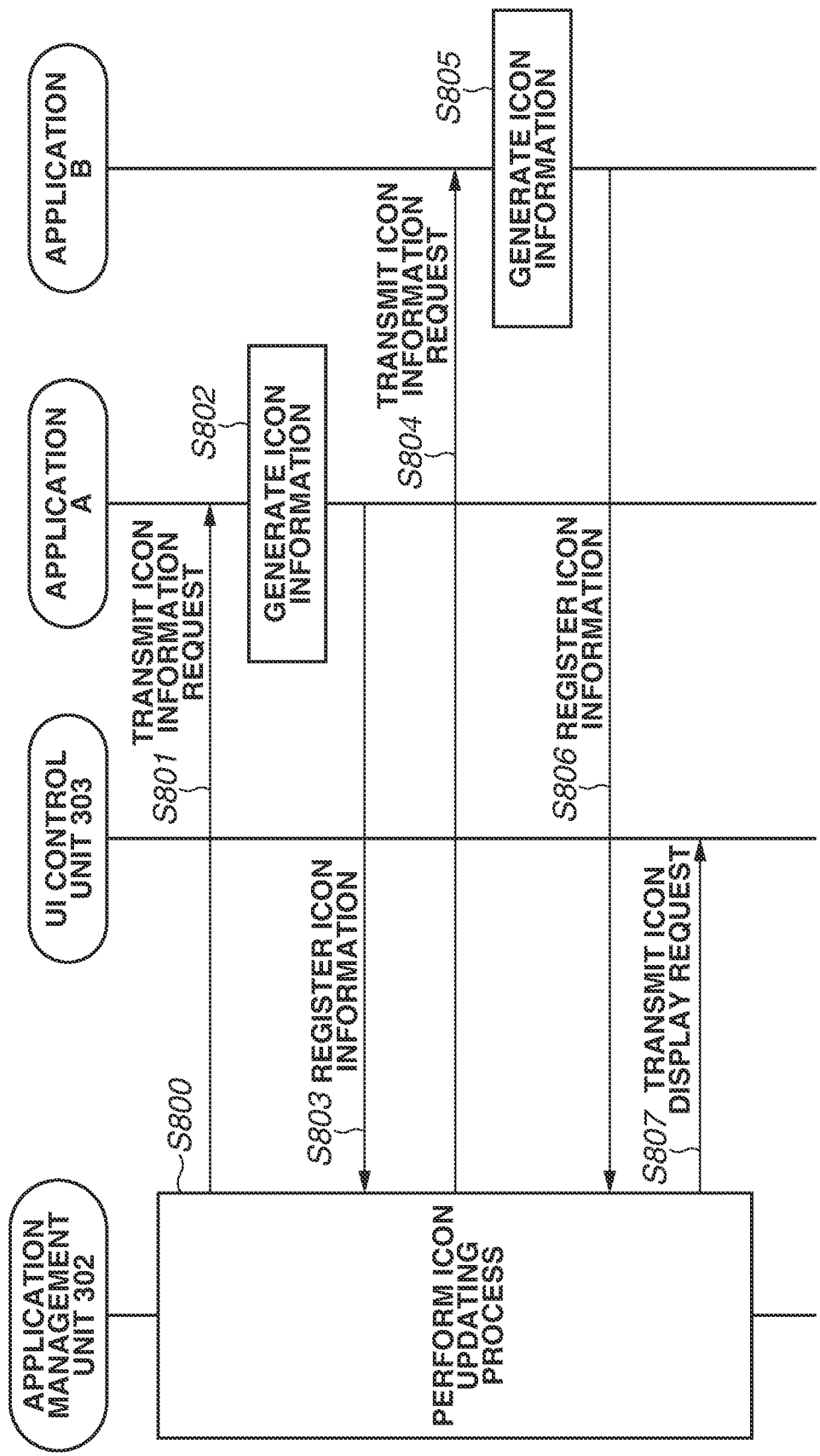
FIG. 8 is a sequence diagram illustrating a process of icon updating in the exemplary embodiment.

FIG. 8 is a flowchart illustrating a process of updating the icons in the image forming apparatus of the present disclosure. The process in FIG. 8 is controlled by the CPU 101. First, in step S801, the application management unit 302 transmits an icon information request to the application A (super business-form). In step S802, the application A having received the icon information request performs icon information generation processing to generate icon information. In step S803, the application A performs icon information registration using the generated icon information. In step S804, the application management unit 302 similarly transmits an icon information request to the remaining application B (easy transmission).

In step S805, the application B having received the icon information request generates icon information, and in step S806, the application B registers the icon information In step S807, the application management unit 302 transmits an icon display request to the UI control 303 after the transmission of an icon information request to every one of the installed applications is completed.

Figure 9:
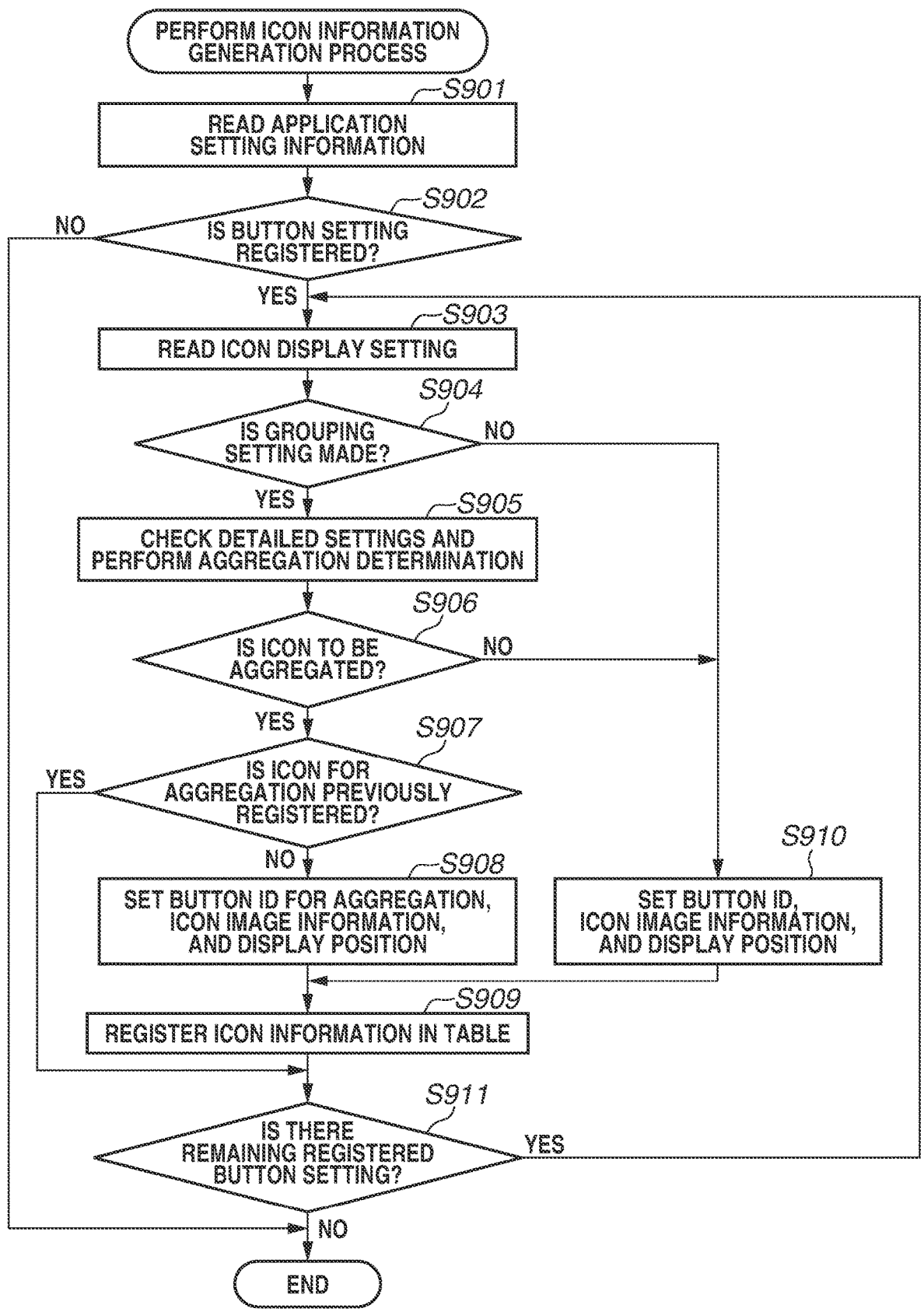
FIG. 9 is a flowchart illustrating a process of generating icon information in the exemplary embodiment.

FIG. 9 is a flowchart illustrating details of the processing of generating icon information (step S802, step S805) described above, where the processing is performed substantially similarly for each application. Specifically, if there is a plurality of applications, the processing that differs for each application in FIG. 9 is performed a plurality of times either in parallel or sequentially. The following describes the super business-form application. In the processing of generating icon information, first, in step S901, the button setting information registered in the storage control unit 306 is read. Specifically, the setting information in FIG. 7 is read. In step S902, if no setting is registered (NO in step S902), the process ends. If a setting is registered (YES in step S902), the processing proceeds to step S903. In the present exemplary embodiment, as illustrated in FIG. 7, four button settings are registered with respect to the super business-form application, so that in order to generate the first "business-form 1" icon information, the processing proceeds to step S903. In step S903, the user checks the icon display grouping setting made in the setting 603. Specifically, the framework reads "iSettings1.dat" in the icon display setting 707 and checks whether the grouping setting is made. In the present exemplary embodiment, the grouping setting is made as illustrated in FIG. 6 (YES in step S904), so that in step S905, the framework reads "iSettings1.dat" and checks detailed grouping settings 604 to 607. Based on the setting 605, the number of registered button settings is four, so that the icons related to the button settings are to be grouped. However, since the setting 607 is set not to group icons that contain "business-form", it is eventually determined that the "business-form 1" icon is not to be aggregated (NO in step S906). Specifically, in step S910, icon information (button ID, icon image information, display position, etc.) is set to the "business-form 1" icon such that an icon is individually generated/displayed, as in the icon generation processing in the case where no grouping setting is set (NO in step S904). Then, in step S909, the icon information is registered in the table in FIG. 10.

Next, in step S911, the remaining button settings are checked. As illustrated in FIG. 7, the remaining three button settings "delivery slip", "lending form", and "management section" are registered in the super business-form application, and steps S903 to S910 are performed for each button setting. As to the "delivery slip", the framework reads "iSettings1.dat" in the icon display setting 707, and the grouping setting is set (YES in step S904). Thus, in step S905, "iSettings1.dat" is read to check the detailed grouping settings 604 to 607. Based on the setting 605, the number of registered button settings is four, so the icon is to be grouped. The conditions of the settings 606 and 607 are not met, it is eventually determined that the "delivery slip" icon is to be aggregated (YES in step S906). The button settings determined to be aggregated are controlled such that only one group icon (aIcon0.dat) is generated and displayed instead of generating and displaying an individual icon for each button setting. Specifically, in step S907, whether a group icon is previously registered in the table is checked. If a group icon is previously registered (YES in step S907), the processing proceeds to check the remaining button settings. If no group icon is registered in the table (NO in step S907), then in step S908, icon information (button ID, icon image information, display position, etc.) is set such that a group icon is generated and displayed. Then, in step S909, the icon information is registered in the table.

Thereafter, similar processing is performed with respect to the "lending form" and "management section" icons, but since a group icon is previously registered in the table (YES in step S907), no new icon information is set and registered in the table in FIG. 10, and the process ends.

FIG. 10 is the table of icon information generated by the icon information generation processing in FIG. 9 and the icon information registration in FIG. 8 (step S803 or S806). The icon information registered in the table is a result of screening all the registered button settings by checking the grouping setting and performing aggregation processing described above. The application management unit 302 transmits an icon display request to the UI control 303 based on the icon information registered in the table, so that the icons are displayed at the operation unit 112. An application ID 1001 is an ID for identifying an application and corresponds to the application ID 1201 in FIG. 12. A button ID 1002 is an ID for identifying a button, and a unique ID is provided at the time of group icon registration in addition to the time of button setting registration. An icon title 1003 is a title at the time of displaying an icon and corresponds to the icon name 701 and the group name 604. A display position 1004 indicates the initial display position of an icon. Icon image information 1005 is icon image pixel information. In the present exemplary embodiment, the button setting "business-form 1" of the super business-form application is determined not to be aggregated and is thus individually registered. The three button settings "delivery slip", "lending form", and "management section" are aggregated and registered to be displayed as one group icon (aIcon0.dat). The icons of the easy transmission application are also aggregated and registered to be displayed as one group icon (bIcon0.dat).

Figure 11:
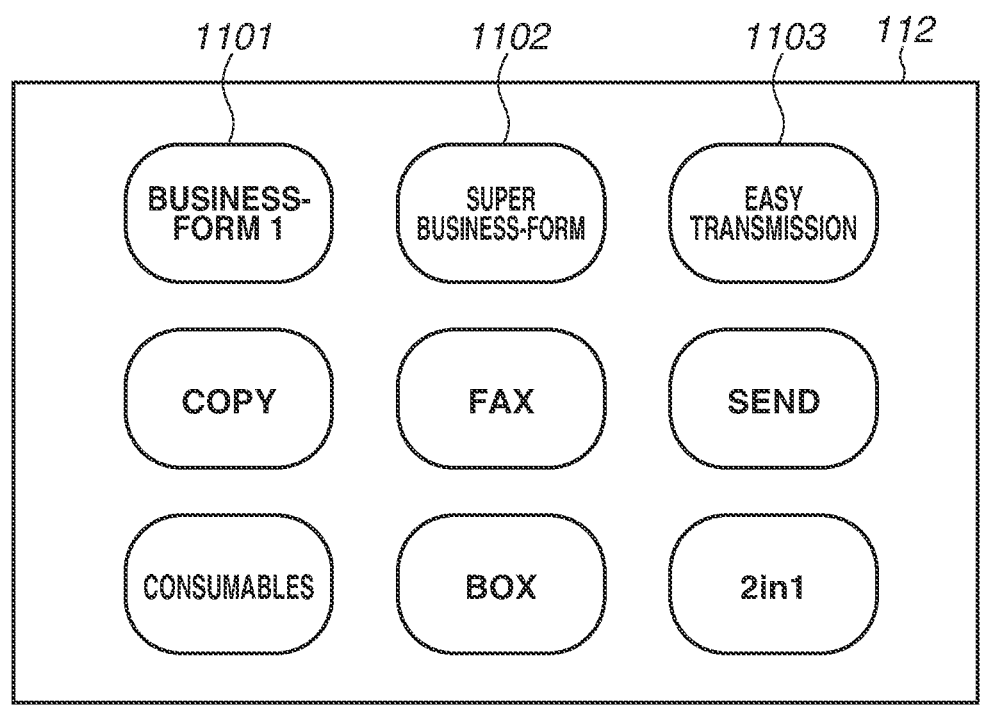
FIG. 11 illustrates an example of the operation screen of the image forming apparatus in the case where icons are aggregated based on a grouping setting in the exemplary embodiment.
Figure 13:
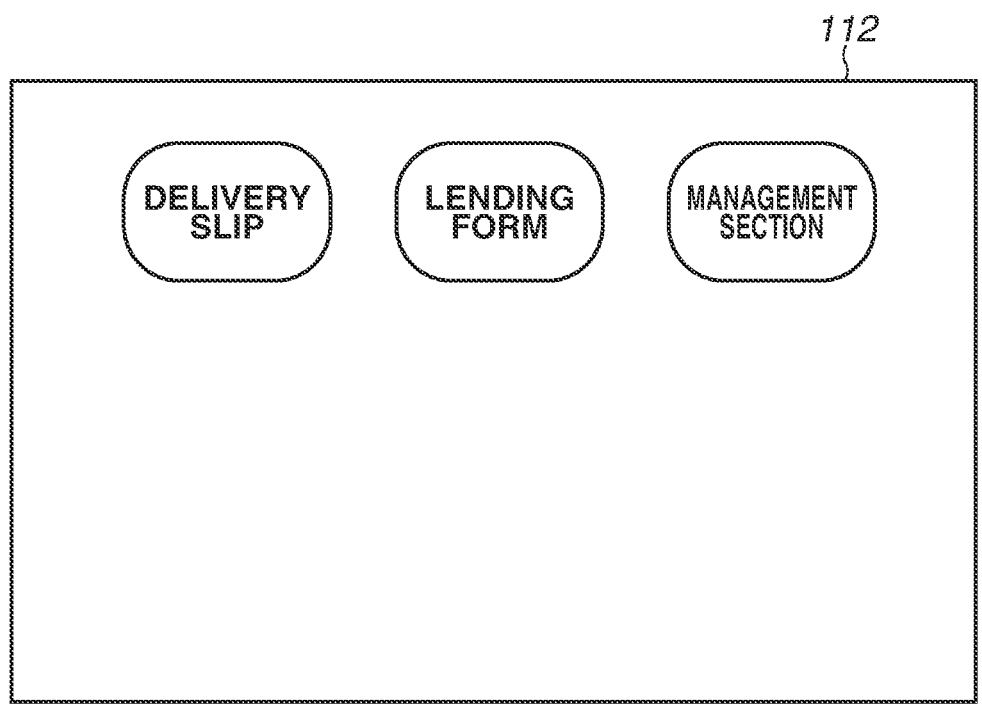
FIG. 13 illustrates an example of the operation screen of the image forming apparatus that is displayed at the press of an aggregation icon in the exemplary embodiment.

FIG. 11 illustrates an example of the display of icons at the operation unit 112 based on the icon information table in FIG. 10. The icons "business-form 1" 1101, "super business-form" 1102, and "easy transmission" 1103 are displayed in addition to the icons "copy", "fax", "send", etc. of the standard function in FIG. 5. The icons are arranged at the beginning based on the display position setting in the icon display setting. If the "super business-form" 1102 is pressed, the screen in FIG. 13 is displayed. Specifically, the three button settings aggregated as "super business-form" are called, and the icon generation/display processing is executed.

As described above, the plurality of icons of the same application, which is conventionally spread across a plurality of screens, is aggregated as a single icon and displayed, so that the user can find a desired icon with ease. The "copy", "fax", "send", "consumables", "box", and "2IN1" buttons relate to the native functions of the image forming apparatus, so that the buttons are displayed at the back without being aggregated.

The icon update processing in FIG. 8 and the icon information generation processing in FIG. 9 are executed when the application management unit 302 performs icon updating and an icon information request triggered by the icon updating is received. The trigger is typically activation processing of the image processing apparatus, language setting changing processing, application enabling/disabling processing, or application setting changing processing (including the registration/deletion of image data). More flexible icon control is possible by performing processing to return the image forming apparatus from a sleep state, processing to simply change the screen of the operation unit, or periodic updating/generation processing using a timer event.

While each application has the group icon in advance in the present exemplary embodiment, the group icon can be registered by the user, or any other configuration can be employed in which icons are displayed such that the aggregation of the icons is recognizable.

The detailed grouping settings 604 to 607 are mere examples, the present exemplary embodiment is not limited to the above-described settings, and any other settings can be employed.

Other Exemplary Embodiment 1

While FIG. 6 illustrates the example in which each application such as the super business-form application has the grouping settings, a similar advantage is also produced by a configuration in which the native program 210 of the image forming apparatus has the grouping settings. The former has an advantage that the display is flexibly changeable by the original settings that each application has. The latter, has an advantage that the settings are collectively settable on the framework side, which runs the extended application, so that the settings do not have to be considered on the application side and thus the operation is carried out with ease.

FIG. 14 illustrates an example of the setting screen in the case where the native program 210 of the image forming apparatus has the grouping setting. In this setting, a grouping on/off setting 1402 and a group name 1403 are settable for each application. For example, if the grouping on/off setting 1402 of the super business-form is set to "ON", the icons of the super business-form are aggregated and displayed. The name that is set to the group name 1403 is assigned as the name of the icon that is aggregated and displayed. In the example in FIG. 14, the "set application name as group name" setting 1401 is enabled, so that the application name "super business-form" is directly assigned as the aggregated icon name. The setting values are registered as the grouping setting 1204 in association with each application on the application management table in FIG. 12.

In the configuration in which the native program 210 of the image forming apparatus has the grouping setting, the grouping setting 1204 associated with each application is read and whether the grouping setting is on/off is checked in the icon information generation processing in step S904 in FIG. 9. For example, in the super business-form icon generation, gSettings1.dat is read, and the icon generation/display processing is executed based on the setting.

In the case where a grouped icon is designated, the following processing is executed. The type of the application of the designated icon is identified. For example, if the icon 1102 in FIG. 11 is pressed, the application "super business-form" is identified. Then, the processing corresponding to the identified application and equivalent to step S901 is executed, and the processing moves to step S909. In step S909, icon information (e.g., aggregated icons in FIG. 7) corresponding to the grouped icon in FIG. 7 is read, and the icons are displayed based on the icon information without being grouped. For example, the icons in FIG. 13 are displayed. In response to the designation of the "super business-form" icon 1102, the aggregated icons as well as the icons (all the icons in FIG. 7) associated with the super business-form application can be displayed. Among the pieces of the information in FIG. 7, the icon information corresponding to the identified application is read. In this example, all the information in FIG. 7 can be read.

As described above, the image forming apparatus 401 into which the extended application 240, which is an example of an extended function program, is installable is disclosed.

The plurality of display items for issuing an instruction to execute a function in the image forming apparatus 401 is displayed at the operation unit 112. Whether to group-display the icons (FIG. 5) that are an example of the plurality of display items for each predetermined function of the image forming apparatus is settable based on an instruction to the CPU 101 (the setting 603 in FIG. 6, etc.).

Based on the setting received by the CPU 101, one display item corresponding to the predetermined function of the image forming apparatus 401 and formed by grouping the plurality of icons is displayed at the operation unit 112.

The image forming apparatus 401 can include the super business-form application or document transmission application as an example of an extended application having a predetermined function.

The CPU 101 groups the icons.

The CPU 101 controls a process of performing at least one group-display of the plurality of display items for each business-form application or each transmission application.

The plurality of icons can be configured to activate the business-form application by a one-touch operation. In this case, different print settings can be input to the business-form application based on an instruction from each of the plurality of icons. The foregoing is an example of a display control unit and group-display control. The operation unit 112 is an example of a display unit. Examples of the image forming apparatus 401 can be a multi-function peripheral and a printer.

The above-described method enables appropriate management of the number of icons displayed on the UI of the information processing apparatus. More specifically, in the case where a single application can have a plurality of icons depending on the setting, execution condition, etc., whether to display a plurality of icons corresponding to the number of conditions (number of registrations) or whether to aggregate and display the plurality of icons can be controlled. In this way, the sorting of icon display is facilitated and, thus, the user can find a desired icon with ease.

Other Exemplary Embodiment 2

A similar advantage is also produced by a configuration in which the grouping setting is not provided and the grouping is determined to be automatically performed based on, for example, the application type (1203). Specifically, there are a super business-form application and an easy transmission application. The button settings of the application type (1203) that is likely to include a large number of icons due to an increased number of registered button settings as a result of the settings of the applications are set as follows. Specifically, control can be performed such that the icons are always aggregated and displayed even if the grouping setting is not made.

For example, a method for flexibly performing display control of a display item configured to issue an instruction to control a function of an image forming apparatus can be provided.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-001456, filed Jan. 9, 2018, which is hereby incorporated by reference herein in its entirety.

What is claimed is:

1. An image forming apparatus into which an application is installable, the image forming apparatus comprising:

one or more processors; and one or more memories storing executable instructions, which when executed by the one or more processors, cause the image forming apparatus to:

control displaying a plurality of display items for a first application installed into the image forming apparatus, the plurality of display items including at least a first display item, a second display item, and a third display item associated with the first application, wherein each of the first display item, the second display item, and the third display item corresponds to a respective function configured to be executed based on first image data and first print settings, second image data and second print settings, and third image data and third print settings associated with the first display item, the second display item, and the third display item, respectively;

obtain one or more settings associated with the first application based at least in part on one or more inputs to a user interface, the one or more settings comprising a grouping condition for grouping the plurality of display items for the first application;

determine two or more display items to include in a display item group associated with the first application in accordance with the grouping condition, wherein the two or more display items include at least the first display item and the second display item of the plurality of display items;

control displaying at least the third display item and a fourth display item without displaying the first display item and the second display item, wherein the fourth display item is a display item for the display item group associated with the first application, the display item group including the two or more display items among the plurality of display items grouped for the first application, wherein the third display item is not included in the display item group based at least in part on the grouping condition;

receive a selection of the displayed fourth display item; and based on the selection of the displayed fourth display item, control displaying at least the first display item and the second display item included in the display item group.

2. The image forming apparatus according to claim 1, wherein the first application is an extended application having a predetermined function.

3. The image forming apparatus according to claim 1, wherein the first application is a business-form application.

4. The image forming apparatus according to claim 3, wherein each of the first display item, the second display item, and the third display item is configured to activate the business-form application to execute the respective function corresponding to the first display item, the second display item, and the third display item based on a one-touch operation selecting the first display item, the second display item, and the third display item, respectively.

5. The image forming apparatus according to claim 1, wherein the display item group is a group of icons.

6. The image forming apparatus according to claim 1, wherein the grouping condition includes a setting of grouping all or a portion of the plurality of display items in a case where a number of the plurality of the display items for the first application is a designated number or more.

7. The image forming apparatus according to claim 1, wherein the grouping condition includes a setting of grouping one or more display items among the plurality of display items in a case where a respective name of each of the one or more display items includes a designated term.

8. The image forming apparatus according to claim 1, wherein the grouping condition includes a setting of excluding a display item of the plurality of display items from being included in the display item group in a case where a name of the display item includes a designated term.

9. A method of controlling an image forming apparatus into which an application is installable, the method comprising:
controlling displaying a plurality of display items for a first application installed into the image forming apparatus, the plurality of display items including at least a first display item, a second display item, and a third display item associated with the first application, wherein each of the first display item, the second display item, and the third display item corresponds to a respective function configured to be executed based on first image data and first print settings, second image data and second print settings, and third image data and third print settings associated with the first display item, the second display item, and the third display item, respectively;
obtaining one or more settings associated with the first application based at least in part on one or more inputs to a user interface, the one or more settings comprising a grouping condition for grouping the plurality of display items for the first application;
determining two or more display items to include in a display item group associated with the first application in accordance with the grouping condition, wherein the two or more display items include at least the first display item and the second display item of the plurality of display items;
controlling displaying at least the third display item and a fourth display item without displaying the first display item and the second display item, wherein the fourth display item is a display item for the display item group associated with the first application, the display item group including the two or more display items among the plurality of display items grouped for the first application, wherein the third display item is not included in the display item group based at least in part on the grouping condition;
receiving a selection of the displayed fourth display item; and
controlling, based on the selection of the displayed fourth display item, displaying at least the first display item and the second display item included in the display item group.

10. The method according to claim 9, wherein the first application is an extended application having a predetermined function.

11. The method according to claim 9, wherein the first application is a business-form application.

12. The method according to claim 11, wherein each of the first display item, the second display item, and the third display item is configured to activate the business-form application to execute the respective function corresponding to the first display item, the second display item, and the third display item based on a one-touch operation selecting the first display item, the second display item, and the third display item, respectively.

13. A non-transitory computer-readable storage medium storing one or more programs comprising instructions, which when executed by an image forming apparatus into which an application is installable, cause the image forming apparatus to perform operations comprising:
controlling displaying a plurality of display items for a first application installed into the image forming apparatus, the plurality of display items including at least a first display item, a second display item, and a third display item associated with the first application, wherein each of the first display item, the second display item, and the third display item corresponds to a respective function configured to be executed based on first image data and first print settings, second image data and second print settings, and third image data and third print settings associated with the first display item, the second display item, and the third display item, respectively;
obtaining one or more settings associated with the first application based at least in part on one or more inputs to a user interface, the one or more settings comprising a grouping condition for grouping the plurality of display items for the first application;
determining two or more display items to include in a display item group associated with the first application in accordance with the grouping condition, wherein the two or more display items include at least the first display item and the second display item of the plurality of display items;
controlling displaying at least the third display item and a fourth display item without displaying the first display item and the second display item, wherein the fourth display item is a display item for the display item group associated with the first application, the display item group including the two or more display items among the plurality of display items grouped for the first application, wherein the third display item is not included in the display item group based at least in part on the grouping condition;
receiving a selection of the displayed fourth display item; and
controlling, based on the selection of the displayed fourth display item, displaying at least the first display item and the second display item included in the display item group.

14. The image forming apparatus according to claim 1, wherein, in response to selection of the first display item, printing is executed based on the first print settings associated with the selected first display item, and, in response to selection of the second display item, printing is executed based on the second print settings associated with the selected second display item.

15. The image forming apparatus according to claim 1, wherein displaying at least the third display item and the fourth display item without displaying the first display item and the second display item comprises displaying at least the third display item, the fourth display item, and a fifth display item, the fifth display item being a display item for a second display item group associated with a second application installed into the image forming apparatus, wherein the second application is a transmission application.

* * * * *